United States Patent
Ocke et al.

(10) Patent No.: US 8,249,735 B2
(45) Date of Patent: Aug. 21, 2012

(54) METHOD AND SYSTEM FOR AUTOMATICALLY IDENTIFYING AN EXISTING WORKFLOW TO MANUFACTURE A GIVEN PRODUCT TYPE

(75) Inventors: Kirk J. Ocke, Ontario, NY (US); Michael David Shepherd, Ontario, NY (US); Dale Ellen Gaucus, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 455 days.

(21) Appl. No.: 12/507,496

(22) Filed: Jul. 22, 2009

(65) Prior Publication Data

US 2011/0022209 A1    Jan. 27, 2011

(51) Int. Cl.
- G06F 21/00 (2006.01)
- G06F 19/00 (2011.01)
- G06F 15/18 (2006.01)
- G06F 17/00 (2006.01)
- G06N 5/02 (2006.01)

(52) U.S. Cl. ............ 700/117; 700/95; 700/97; 700/104; 706/12; 706/47; 705/54

(58) Field of Classification Search .......... 700/95, 700/97, 104, 117; 706/12, 47; 705/54
See application file for complete search history.

(56) References Cited

U.S. PATENT DOCUMENTS

| | | | | |
|---|---|---|---|---|
| 7,406,357 B2 * | 7/2008 | Ocke et al. | | 700/97 |
| 7,454,397 B2 * | 11/2008 | Ocke | | 706/47 |
| 7,580,911 B2 * | 8/2009 | Sun et al. | | 706/50 |
| 7,979,376 B2 * | 7/2011 | Shepherd et al. | | 706/47 |
| 2005/0004893 A1 * | 1/2005 | Sangroniz | | 707/3 |
| 2006/0253213 A1 * | 11/2006 | Ocke et al. | | 700/97 |
| 2007/0094200 A1 * | 4/2007 | Ocke | | 706/47 |
| 2008/0259379 A1 | 10/2008 | Shepherd | | 358/1.15 |
| 2009/0076998 A1 * | 3/2009 | Ocke et al. | | 706/47 |
| 2009/0138424 A1 * | 5/2009 | Shepherd et al. | | 706/47 |
| 2010/0095246 A1 * | 4/2010 | Shepherd | | 715/835 |
| 2011/0022498 A1 * | 1/2011 | Ocke et al. | | 705/27.1 |

OTHER PUBLICATIONS

FreeFlow VI Suite, Fuji Xerox www.fujixerox.com.au.
FreeFlow Process Manager, Fuji Xerox, www.fujixerox.com.au.
Xerox FreeFlow Digital Workflow Collection, www.xerox.com/FreeFlow.
Xerox FreeFlow Process Manager, www.xerox.com/freeflow.
Xerox FreeFlow Solutions, http://www.xerox.com/digital-printing/print-solutions/workflow.
PriorArtDatabase; Technical Disclosure; IP.com; IP.com No. IPCOM000144025D; Electronic Publication: Dec. 14, 2006.

* cited by examiner

*Primary Examiner* — Ronald Hartman, Jr.
(74) *Attorney, Agent, or Firm* — Luis M. Ortiz; Kermit D. Lopez; Tuesday A. Kaasch (57) ABSTRACT

A method and system for automatically identifying an existing workflow to manufacture a given product type. A workflow description of a workflow can be transformed into a product type description utilizing particular facts associated with the workflow. An inferred product type description can then be at least one product type among a group of product type descriptions representing known product types. A mapping can then be derived of the workflow with respect to product types, in response to comparing the inferred product type description to the product type description(s) among product type descriptions representing known product types. The workflow description can be converted into the product type description utilizing a rule-based expert system. The particular facts can be one or more of the following: processing steps, sequences of processing steps, types of operations to be performed, and outputs produced.

16 Claims, 9 Drawing Sheets

| WORKFLOW # | WORKFLOW STEPS AND PARAMETERS |
|---|---|
| 1 | IMPOSE [5x2 MULTI-UP, 8.5"x11" MEDIA] → PRINT [8.5"x11" MEDIA] |
| 2 | IMPOSE [SIGNATURE BOOKLET, 17"x11" MEDIA] → PRINT [17"x11" MEDIA] |
| 3 | IMPOSE [5x4 MULTI-UP, 8.5"x11" MEDIA → PRINT [8.5"x11" MEDIA] |
| 4 | PRINT [ANY MEDIA, STITCHED] |
| ... | ... |

*FIG. 6*

| WORKFLOW # | PRODUCT TYPE DESCRIPTION | WORKFLOW STEPS AND PARAMETERS |
|---|---|---|
| 1 | BUSINESS CARD | IMPOSE [5x2 MULTI-UP, 8.5"x11" MEDIA] → PRINT [8.5"x11" MEDIA] |
| 2 | BOOKLET | IMPOSE [SIGNATURE BOOKLET, 17"x11" MEDIA] → PRINT [17"x11" MEDIA] |
| 3 | UNKNOWN | IMPOSE [5x4 MULTI-UP, 8.5"x11" MEDIA → PRINT [8.5"x11" MEDIA] |
| 4 | STITCHED PAGES | PRINT [ANY MEDIA, STITCHED] |
| ... | | ... |

| PRODUCT TYPE CLASSIFICATION CHARACTERISTICS |
|---|
| FINISHED DIMENSIONS == 3.5" x 2" OR SMALLER<br>BINDING == NONE<br>VALID NUMBER OF PAGES = [1..2]<br>IMPOSITION REQUIRED == MULTI-UP |

*FIG. 9*

| PRODUCT TYPE NAME | PRODUCT TYPE CLASSIFICATION CHARACTERISTICS |
|---|---|
| ANALYZE PRODUCT TYPE CHARACTERISTICS | FINISHED DIMENSIONS == 3.5" x 2" OR SMALLER<br>BINDING == NONE<br>VALID NUMBER OF PAGES = ANY<br>IMPOSITION REQUIRED == MULTI-UP CUT & STACK |

*FIG. 10*

| PRODUCT TYPE NAME | PRODUCT TYPE CLASSIFICATION CHARACTERISTICS |
|---|---|
| ANALYZE PRODUCT TYPE CHARACTERISTICS | FINISHED DIMENSIONS == 3.5" x 2" OR SMALLER<br>BINDING == STITCHING OR TAPE OR ....<br>VALID NUMBER OF PAGES = ANY<br>IMPOSITION REQUIRED == NONE |

| CATALOG ENTRY NAME | CATALOG ENTRY DESCRIPTION |
|---|---|
| BUSINESS CARD | SIZE == 3.5" x 2"<br>BINDING == NONE<br>PAGES = [1..2] |
| BOOKLET | SIZE == ANY<br>BINDING == SADDLE STITCHED<br>PAGES = [1..48] |
| STITCHED PAGES | SIZE == ANY<br>BINDING == CORNER STITCHED<br>PAGES = [2..100] |
| .... | .... |

FIG. 13

METHOD AND SYSTEM FOR AUTOMATICALLY IDENTIFYING AN EXISTING WORKFLOW TO MANUFACTURE A GIVEN PRODUCT TYPE

TECHNICAL FIELD

Embodiments are generally related to data-processing systems and methods. Embodiments also relate in general to the field of computers and similar technologies and, in particular, to software utilized in this field. Embodiments are additionally related to workflows and product types in the context of rending systems, networks, and devices.

BACKGROUND OF THE INVENTION

JDF (Job Definition Format) is an example of an open, extensible, XML-based print workflow specification framework. The JDF format ties together authoring, production, management, manufacturing, delivery, and MIS (Management Information System) control. The JDF intent-to-process conversion system transforms a product description (e.g., JDF Intent) into a process network (e.g., JDF process) and specifies dynamic process parameters with respect to each process node for execution by a workflow system. Such a conversion approach utilizes information provided in the product description to completely parameterize a workflow plan to manufacture a desired product. The product description includes intent parameters associated with product characteristics such as, for example, binding, color models, finishing sizes, references to artwork content such as PDL, and supporting data files (e.g., images, fonts, profiles, etc.). The process networks in combination with the static process parameters set on specific workflow applications in a workflow system result in a fully populated workflow specification for a production shop.

When a workflow is defined in the context of a workflow system, the workflow is intended to manufacture some particular product type. For example, a workflow that includes a signature booklet imposition followed by printing and finally saddle stitching is most likely intended to manufacture booklets. The relationship between the workflow and the description of the type of the product to be manufactured by the workflow is usually implicit in the workflow system and only explicitly known to the people utilizing the workflow system. In some cases a name (or tag) may be provided to the workflow. An example of such a name or tag is "My Booklet Workflow". One problem with this approach is that the name or tag may not be suitable for use with a completely automated workflow system. The explicit relationship between individual workflows and the type of product manufactured by the workflow is necessary where lights-out automation is desired. Also, the existing intent-to-process conversion system is limited by the fact that it does not currently consider the product types that can be manufactured by the various workflows in a workflow system. Furthermore, configuring an order entry system for a production shop that reflects what can actually be manufactured by the production shop's workflow system is currently accomplished manually.

Based on the foregoing, it is believed that a need exists for an improved method and system for automatically identifying a target workflow to manufacture a product type. A need also exists for a method and system for determining the type of products manufactured by the workflow and automatically configuring an order entry, as described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved data-processing method, system and computer-usable medium.

It is another aspect of the present invention to provide for automatically identifying an existing workflow to manufacture a given product type.

The aforementioned aspects and other objectives and advantages can now be achieved as described herein.

A method and system are disclosed for automatically identifying an existing workflow to manufacture a given product type. A workflow description of a workflow can be transformed into a product type description utilizing particular facts associated with the workflow. An inferred product type description can then be at least one product type among a group of product type descriptions representing known product types. A mapping can then be derived from the workflow with respect to product types, in response to comparing the inferred product type description to the product type description(s) among product type descriptions representing known product types. The workflow description can be converted into the product type description utilizing a rule-based expert system. The particular facts can be one or more of the following: processing steps, sequences of processing steps, types of operations to be performed, and outputs produced.

In one embodiment, the product description may be classified as a specific product type utilizing a product type classification system. The product description can be routed to a target workflow that is reliably classified to manufacture the product type associated with the product description. The classification of the workflow can be automatically done by comparing a workflow description to a set of product type descriptions in order to determine the product type(s) the workflow is intended to manufacture by a rule-based expert system. Note that a "product type description" as utilized herein describes a particular product type using well-defined product type characteristics (e.g., a Booklet is always saddle stitched). A product type description does not describe a specific product to be manufactured. Instead, it describes the characteristic required of a "product intent description" in order for it to be classified as the given product type. A "product intent description" as utilized herein refers generally to a specific product to be manufactured.

The detailed product descriptions for the product types associated with the workflow can be utilized to create/populate the product catalog entries of an order entry system. Thereafter, a workflow automation system converts the product description to a workflow plan utilizing both the product description and the target workflow description. The resulting process may be utilized by the workflow automation system to manufacture the product. Note that the term "product description" as utilized herein is a synonym for "product intent description".

In another embodiment, the workflow description from the workflow (e.g., the type of imposition—signature booklet, multi-up) associated with the workflow system and the product type descriptions (e.g., Business Cards are 3.5"×2", Booklets require saddle stitching) can be provided to the rule-based system. The rule-base that realizes relationships between the workflow steps and the characteristics utilized to describe the product types can be loaded into the rule-based system. The facts collected from the product type descriptions and the rule-base can be utilized by the rule-based expert system to map the workflow description to a set of zero or more pre-existing product types. Alternatively, if a match to a pre-existing product type does not exist, then the product type description inferred by the rule-base can be added to the existing product type classification system. Such an approach can be done automatically or after confirmation from a user of the system. If the expert system cannot determine even a suitable product type description, then a notification can be presented to the user of the system.

In a second embodiment, the workflows in the workflow system can be queried to determine the workflow that matches the product type associated with the product description. If the workflows do not have product types associated with them, then the workflows can be automatically classified as described in the first embodiment and the workflows can be subsequently queried. If exactly one workflow matches the product description, then the workflow can be utilized as the target workflow and the result can be sent automatically to the workflow for processing. If more than one workflow matches, then a workflow system operator can be presented with a choice to choose the workflow. If no workflow matches, then the workflow system operator can be prompted to create a valid workflow. The information about the target workflow along with the information from the product description produce a process network consistent with the product description and the target workflow that is more likely to be consistent with the user's expectations.

In a third embodiment, the order entry system queries the workflow system to retrieve a list of product types associated with the workflows in the workflow system. If the product types are not available, the order entry system can request the workflow system to determine the list of product types that the workflow can manufacture as described in the first embodiment. The order entry system then retrieves the detailed product type descriptions for the various product types from the product type library. The order entry system utilizes the product type descriptions and the workflow descriptions to create/populate the document catalog entries. Such an approach reduces the time required to synchronize the configurations of the order entry system with that of the workflow automation system and increases reliability.

Also, routing the product description to the workflow that is reliably known to manufacture the product type described by the product description enable some aspects of lights-out automation. Furthermore, reliably associating the workflow with a semantically meaningful product type name and with an entire set of semantically meaningful product type characteristics enables several unique applications. Such an approach allows the customer to define the product types simply by defining workflows to manufacture the products. The relationship between the workflow and the description of the type of product to be manufactured by the workflow are known to the user utilizing the workflow system.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
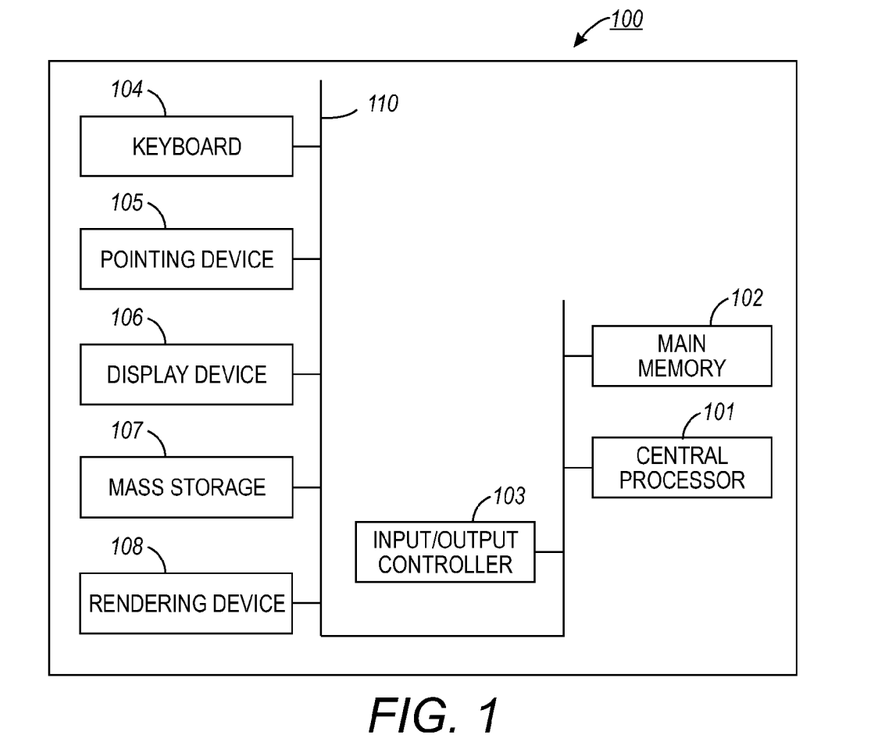
FIG. 1 illustrates a schematic view of a computer system in which the present invention may be embodied.
Figure 2:
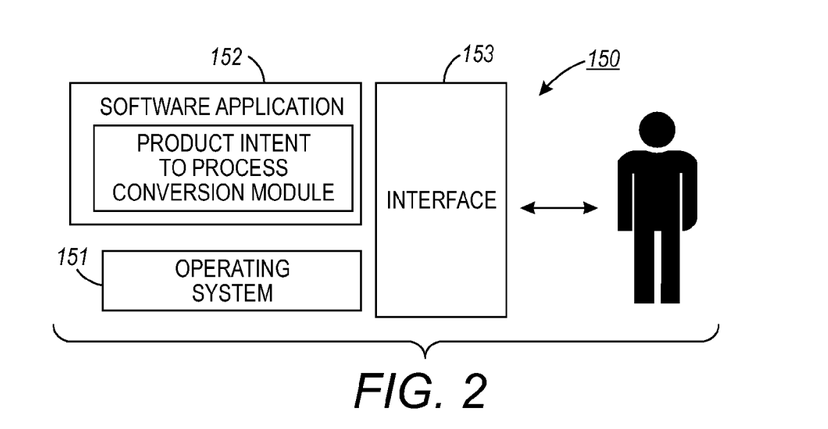
FIG. 2 illustrates a schematic view of a software system including an operating system, application software, and a user interface for carrying out the present invention.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108, may be included in the data-processing apparatus 100 as desired. The rendering device 108 may be a standalone single function device such as a dedicated printer, scanner, copy machine, etc. As illustrated, the various components of the data-processing apparatus 100 communicate through a system bus 110 or similar architecture.

FIG. 2 illustrates a computer software system 150 for directing the operation of the data-processing apparatus 100 depicted in FIG. 1. Software system 150, which is stored in system memory 102 and on disk memory 107, can include a kernel or operating system 151 and a shell or interface 153. One or more application programs, such as application software 152, may be "loaded" (i.e., transferred from storage 107 into memory 102) for execution by the data-processing apparatus 100. The data-processing apparatus 100 receives user commands and data through user interface 153; these inputs may then be acted upon by the data-processing apparatus 100 in accordance with instructions from operating module 151 and/or application module 152.

The interface 153, which is preferably a graphical user interface (GUI), also serves to display results, whereupon the user may supply additional inputs or terminate a given session. Note that the term "GUI" generally refers to a type of environment that represents programs, files, options and so forth by means of graphically displayed icons, menus, and dialog boxes on a computer monitor screen. A user can interact with the GUI 153 to select and activate such options by pointing and clicking with a user input device such as, for example, a pointing device such as a mouse, and/or with a keyboard. A particular item can function in the same manner to the user in all applications because the GUI provides standard software routines (e.g., module 152) to handle these elements and reports the user's actions.

In one possible embodiment, operating system 151 and interface 153 can be implemented in the context of a "Windows" system. It can be appreciated, of course, that other types of systems are possible. For example, rather than a traditional "Windows" system, other operation systems such as, for example, Linux may also be employed with respect to operating system 151 and interface 153. Module 152 can be adapted for automatically identifying a target workflow to manufacture a product type, a module adapted for determining type of products manufactured by the workflow, and a module adapted for automatically populating an order entry system with product catalog entries utilizing the product description information. Application module 152, on the other hand, can include instructions such as the various operations described herein with respect to the various components and modules described herein such as, for example, the methods 300, 600 and 900 depicted in FIGS. 4, 8 and 12.

The following description is presented with respect to embodiments of the present invention, which can be embodied in the context of a data-processing system such as data-processing apparatus 100 and computer software system 150 depicted respectively FIGS. 1-2. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms including Macintosh, UNIX, LINUX, and the like. Therefore, the description of the exemplary embodiments, which follows, is for purposes of illustration and not considered a limitation.

Figure 3:
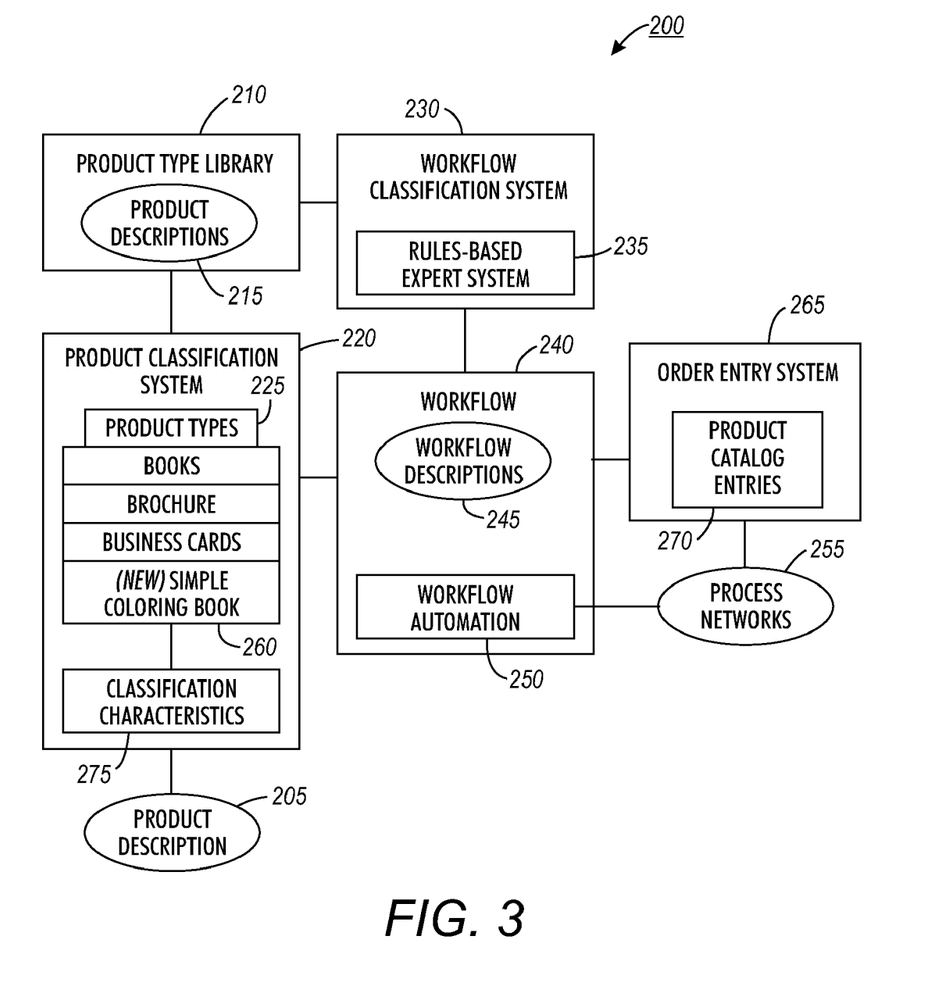
FIG. 3 illustrates a block diagram of an overall workflow of a product intent description to process conversion system, in accordance with a feature of the present invention.

FIG. 3 illustrates a block diagram of an overall workflow of a JDF product description (JDF intent) to process conversion system 200, in accordance with a feature of the present invention. JDF (Job Definition Format) is a comprehensive XML-based file format for end-to-end job ticket specification within a print shop. Note that the JDF intent is a subset of JDF that allows a product to be described utilizing a formalized set of structures and vocabulary. The product description to process conversion system 200 transforms a product description 205 into a process network (JDF process) that can be utilized to manufacture the product. The system 200 generally includes a product type library 210, a product type classification system 220, a workflow system 240, a workflow classification system 230, and an order entry system 265. The product description 205 can be classified as a specific product type 225 (e.g., Business Card) utilizing the product type classification system 220. The product description 205 can be classified based on the classification characteristics 275.

The product type library 210 consists of semantically well-defined product type descriptions 215 such as, for example, a "Business Card" must be 3.5"×2", has no binding, is at most 2 pages, etc. The product classification system 220 can classify the product description 205 as the product type 225 in the product type library 210. The workflow system 240 generally includes one or more workflows and each workflow can be classified as being capable of manufacturing one or more product types defined in the product type library 210. The workflow descriptions 245 associated with each workflow can be classified by the workflow classification system 230 for determining the types of products manufactured by the workflow. The workflow system 240 routes the product description 205 to a workflow that is capable of manufacturing the product described by the product description 205.

A rule-based expert system 235 maps the workflow description 245 to a set of product type characteristics and eventually to the product type description 215. The system 200 further includes an order entry system 265 that presents to a print buyer the product descriptions 215 in the form of document/product catalog entries 270. The order entry system 265 retrieves from the workflow system 240 a list of product types associated with the workflows in the workflow system 240. Furthermore, the actual detailed product type descriptions 215 for the various product types 225 can also be retrieved and utilized to populate the product/document catalog entries 270 within the order entry system 265. The product description 205 in association with a target workflow can be sent to a workflow automation system 250 and then transformed into JDF process networks 255. Note that the workflow automation system 250 is preferably a part of the overall workflow system 240. The JDF process 255 generally represents a workflow plan. Specifically, JDF process 255 provides a way to describe the workflow plan in a print shop. The specific structural details disclosed herein are not to be interpreted as limiting, but merely as a representative basis for the claims and/or as a representative basis for teaching one skilled in the art to variously employ the present invention.

Figure 4:
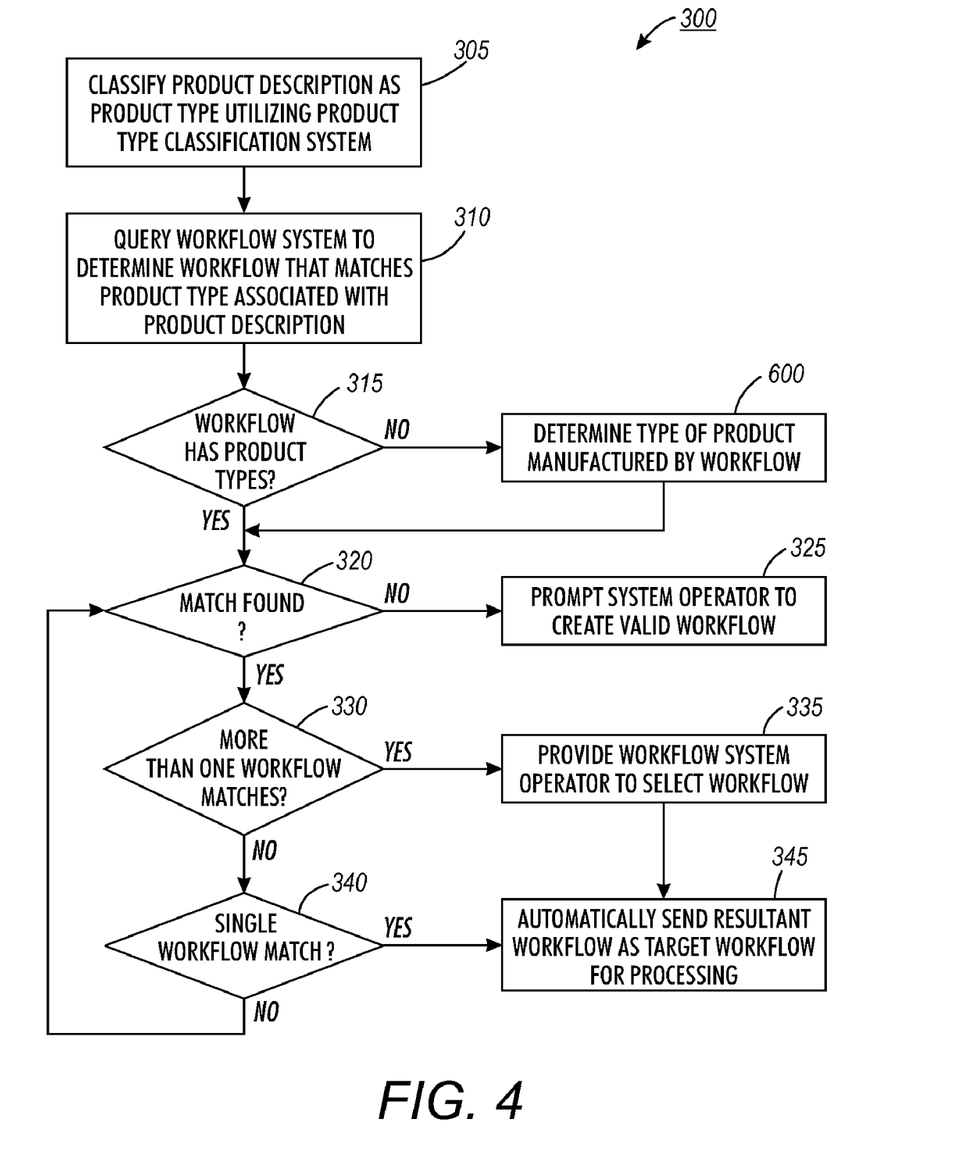
FIG. 4 illustrates a high level flow chart of operations illustrating logical operational steps of a method for automatically identifying a target workflow to manufacture a product type, in accordance with another feature of the present invention.

FIG. 4 illustrates a high level flow chart of operations illustrating logical operational steps of a method 300 for automatically identifying target workflow to manufacture a product type, in accordance with another feature of the present invention. Note that in FIGS. 1-13, identical or similar blocks are generally indicated by identical reference numerals. The product description 205 can be classified as the product type 225 utilizing the product type classification system 220, as depicted at block 305. The workflows in the workflow system 240 can be queried to determine the workflow that matches the product type 225 associated with the product description 205, as illustrated at block 310. Thereafter, a determination can be made whether the workflow have a product type, as indicated at block 315. If the workflow does not have product types, then the type of product manufactured by the workflow can be determined and then the workflow can be subsequently queried, as illustrated at block 600.

A determination can then be made whether the workflow matches a product type, as indicated at block 320. If a match is not found, a workflow system operator can be prompted to create a valid workflow or the job can be rejected, as depicted at block 325. Otherwise, another determination can be made if more than one workflow matches the product type, as indicated at block 330. If more than one workflow matches the product type, then the workflow system operator can be presented with a choice to choose the workflow, as illustrated at block 335. Once the operator (or automaton) selects the workflow, the resultant workflow can be automatically sent as the target workflow for processing, as depicted at block 345. Thereafter, another determination can be made if exactly one workflow matches the product type, as indicated at block 340. If exactly one workflow matches, then the intent-to-process conversion system 200 automatically sends the resultant workflow as the target workflow for processing, as depicted at block 345.

Figure 5:
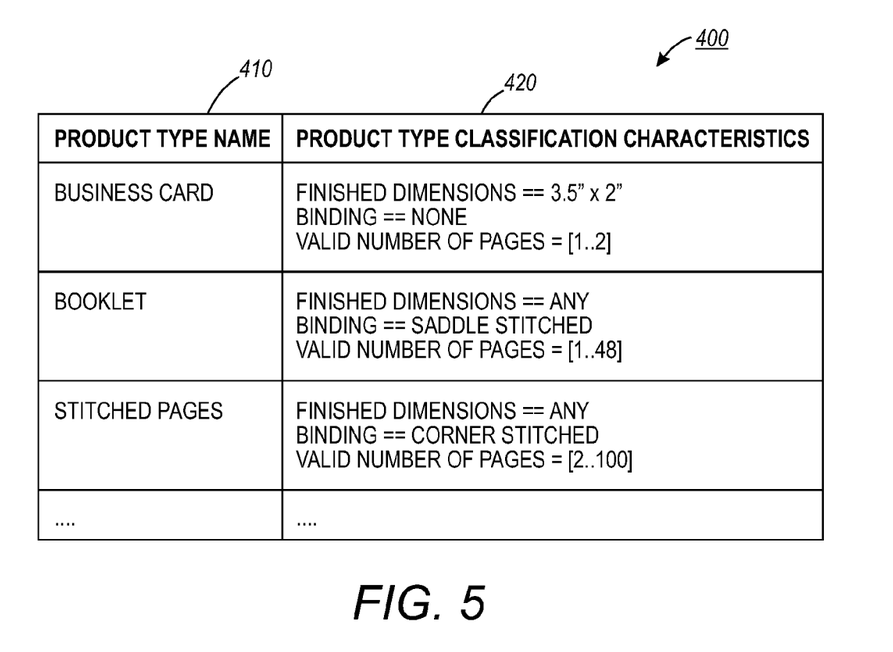
FIG. 5 illustrates a GUI of a JDF product description resource information associated with a product-type library, in accordance with an exemplary embodiment.

FIG. 5 illustrates GUI 400 of process description resource information 215 associated with the product type library 210, in accordance with an exemplary embodiment. Note that the GUI window 400 can be implemented utilizing the interface 153 and can be provided by a module such as, for example, module 152. GUI window 400 can be displayed via a display device 106 depicted in FIG. 1. Note that the GUI window 400 as utilized herein generally constitutes a portion of a monitor screen that contains its own document or message. The GUI window 400 includes a product type name 410 and product type classification characteristics 420. The product description to process conversion system 200 has an existing product type description 215 and classification system 220, where specific product types are associated with semantically meaningful descriptions of the product type name 410.

Figure 6:
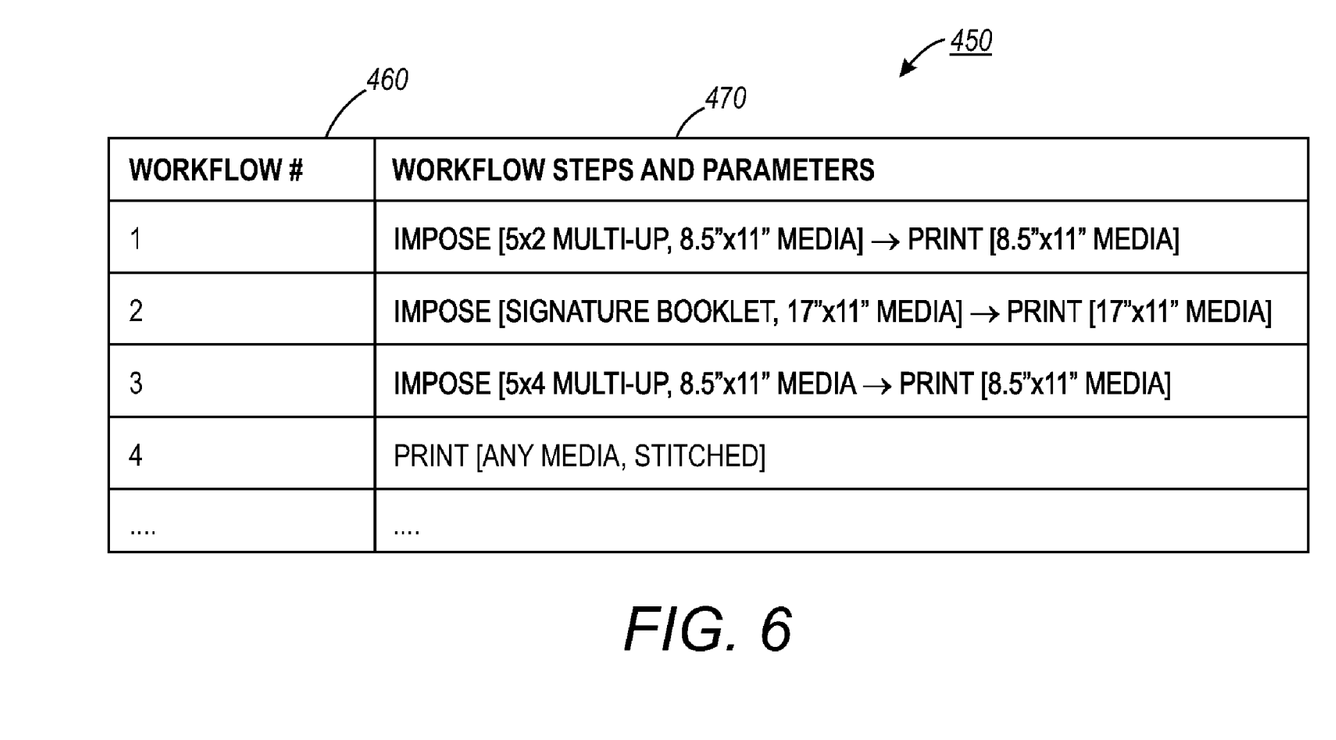
FIG. 6 illustrates a GUI of a workflow resource information associated with a workflow automation system, in accordance with an exemplary embodiment.

FIG. 6 illustrates a GUI 450 of workflow resource information associated with the workflow automation system 240, in accordance with an exemplary embodiment. The workflow automation system 240 with a set of workflows has an associated workflow description 245 each of which describes a manufacturing process. The rule-based expert system 235, for example, allows the creation of product type descriptions intended to be automatically associated with the given workflow. The GUI window 300 includes workflow 460 and its associated product type classification characteristics 470.

Figure 7:
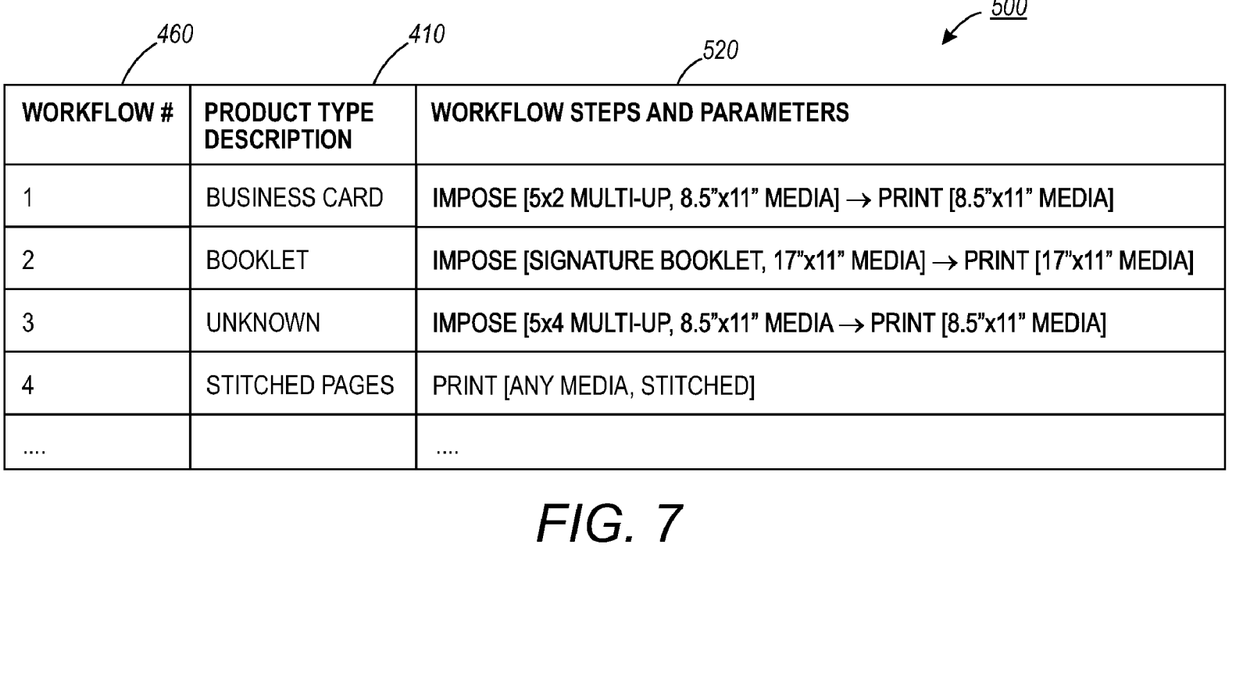
FIG. 7 illustrates a GUI of the workflow resource information in association with the product description to manufacture a product type, in accordance with an exemplary embodiment.

FIG. 7 illustrates a GUI 500 of workflow resource information associated with the product description to manufacture a product type, in accordance with an exemplary embodiment. The rule-based expert system 235 maps the workflow description 460 and 470 to a set of product type characteristics 420 and eventually to a product type description 410. The product description 205 arrives at the workflow automation system 240 can be classified as a "Business Card." The workflow system 240 has not yet established associations between the workflows and the product types defined in the product type library 210.

The workflow system 240 now invokes the method 600 for determining the types of products manufactured by the workflow. The workflow system 240 now selects workflow #1 to manufacture the product description 205. The JDF product description 205 and workflow #1 can be utilized by the product description to process conversion system 200 to convert the product description 205 into process 255. If the workflow is tagged manually (with semantically meaningful product type names and descriptions), then the tagging can be validated utilizing the user interface 153. The rule-based expert system 235 reliably associates the workflow with a semantically meaningful product type name or with an entire set of semantically meaningful product type characteristics.

Figure 8:
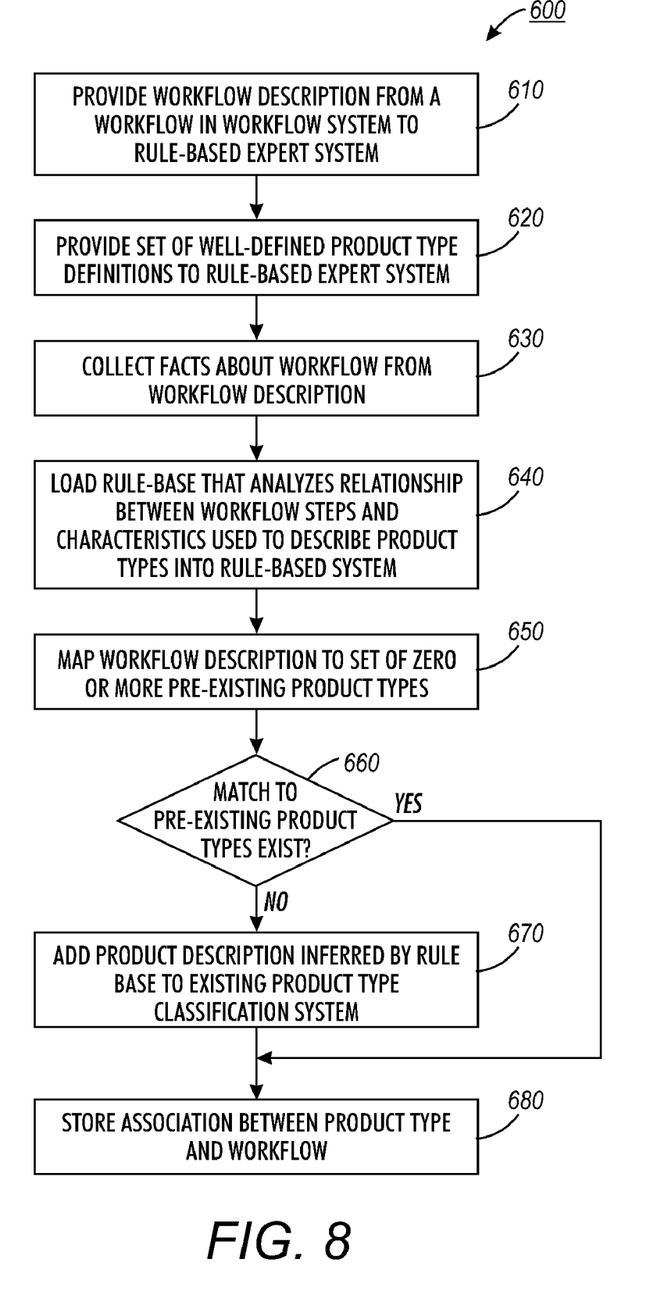
FIG. 8 illustrates a high level flow chart of operations illustrating logical operational steps of a method for determining type of products manufactured by a workflow, in accordance with another feature of the present invention.

FIG. 8 illustrates a high level flow chart of operations illustrating logical operational steps of a method 600 for determining type of products manufactured by a workflow, in accordance with another feature of the present invention. Again as reminder, in FIGS. 1-13, identical or similar blocks are generally indicated by identical reference numerals. The workflow description 245 from a workflow in the workflow system 240 can be provided to the rule-based expert system 235, as indicated at block 610. The set of well-defined product type descriptions 215 can be provided to the rule-based expert system 235, as illustrated at block 620. Next, as indicated at block 630, the facts (e.g., information) regarding the workflow can be collected from the workflow description 245.

The facts collected include the sequence of workflow steps, the type of imposition for each imposition workflow step (e.g., multi-up, signature-booklet, etc), the media size (image size) required for each workflow step, the final print media size (e.g., press-sheet size), the binding to be performed (in-line and/or offline), and the folding to be performed (inline and/or offline). The rule-base that understands the relationships between workflow steps and the characteristics utilized to describe the product types can be loaded into the expert system 235, as depicted at block 640. The rule-base can be already created and deployed as part of the expert system 235. In other words, the knowledge engineering required to create the rule-base has occurred either as part of the development of the expert system 235 or when the expert system 235 is deployed.

The facts collected from the existing product type descriptions 215 and the rule-base can be utilized by the rule-based expert system 235 to map the workflow description 245 to a set of zero or more pre-existing product types 225, as illustrated at block 650. A determination can be made if a match to the pre-existing product type 225 exists, as indicated at block 660. If a match to the pre-existing product type 225 does not exist, then the product type description inferred by the rule-base can be added to the existing product type classification system 220, as depicted at block 670. Such an approach can be done automatically or after confirmation from a user of the system 200. An arbitrary or user defined product type name such as "simple coloring book" can be given to the new product type description 260.

If the rule-based expert system 235 cannot determine even a suitable product type description, then a notification such as, for example, a warning or an error message can be presented to the user of the system 200. Note that a given workflow may be mapped to more than one product type description. For example, in some workflow systems, a single workflow may be specified, produces either business cards or post cards, if an imposition of maximum multi-up is utilized given that the cutting process is outside the scope of the workflow system. The association between the product type and the workflow can be persistently stored for later use by other applications, as illustrated at block 680.

The method 600 described herein is intended to mimic the reasoning that a human can perform when analyzing the workflow to determine the kind of product the system 200 can manufacture. A great deal of the knowledge required to build the expert system 235 is readily available from sources such as, for example, customer facing teams that help develop workflow solutions, information gathered from customer visits, and general industry knowledge of production workflows. The mechanism of discovering new product types and adding them to the product type library 210 ensures that the product type library 210 remains consistent (e.g., no duplicate or conflicting product type definitions).

Figure 9:
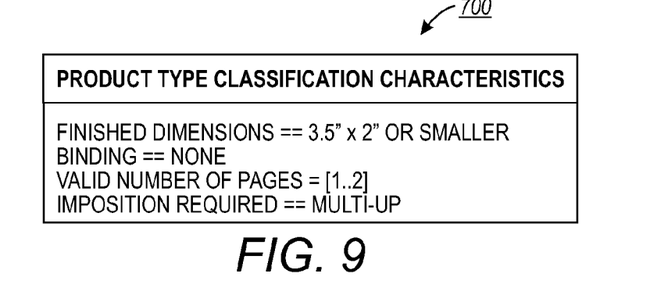
FIGS. 9-11 illustrate a GUI of the type of products manufactured by the workflows, in accordance with an exemplary embodiment.

For example, consider analyzing the following workflow description "Impose [5×2 Multi-up Step & Repeat, 8.5"×11" Media]→Print [8.5"×11" Media]" where all settings specified in the workflow must be utilized. The rule-based expert system 235 analyzes the workflow and determines that for a product manufactured by this workflow, the finished (final) dimensions must be smaller than or equal to 3.5"×2". This can be determined from the fact that any larger size product cannot be imposed by the impose step without clipping the pages or reducing to fit. The system 200 also determines that there is no binding based on the form of the imposition and the fact that no default binding is specified in the print step. Also, there must be 2 or fewer pages in the job since the imposition is step and repeat and the product can be either single or double sided. This is determined because nothing is specified about the sidedness in either the impose step or print step. The resulting characteristics from the analysis describe a product type 700, as illustrated in FIG. 9.

The rule-based expert system 235 then compares the characteristics to the already known product type descriptions and determines that the product type "Business Card" matches the inferred characteristics. As required, detailed embodiments of the present invention are disclosed herein; however, it is to be understood that the disclosed embodiments are merely exemplary of the invention that may be embodied in various and alternative forms. Note that the inference rules described in this example (above) and in following examples are not intended to be completely accurate. They are instead intended to demonstrate the nature of such inference rules. The actual inference rules are, in many cases, significantly more complex and interdependent.

Figure 10:
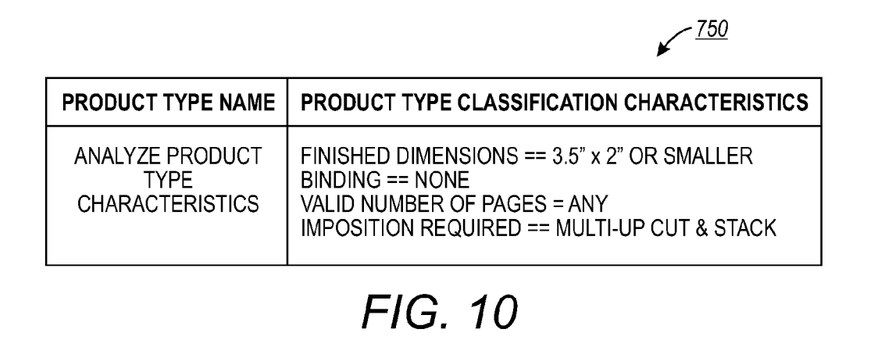

Consider another example for analyzing the following workflow description "Impose [2×1 Multi-up Cut & Stack, 17"×11" Media]→Print [17"×11" Media]". The rule-based expert system 235 analyzes the workflow and determines that for a product manufactured by this workflow, the finished (final) dimensions must be smaller than or equal to 8.5"×11". This is determined from the fact that any larger size product cannot be imposed by the impose step without clipping the pages or reducing to fit. The rule-based expert system 235 also determines that there is no binding based on the form of the imposition and the fact that no default binding is specified in the print step. The product can be either single or double sided and is determined because nothing is specified about the sidedness in either the impose step or print step. The resulting characteristics from this analysis describe a product type 750, as illustrated in FIG. 10.

Figure 11:
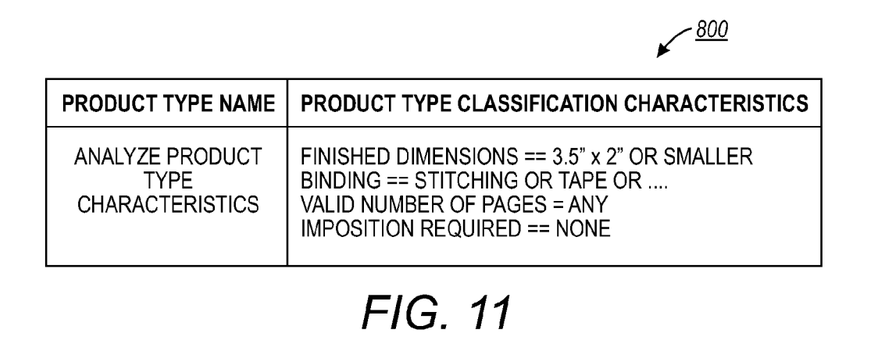

The rule-based expert system 235 then compares these characteristics to the already known product type descriptions and determine that no currently defined product matches the inferred characteristics. The rule-based expert system 235 continues to analyze the workflow looking for less obvious matches between product types and the workflow. Since the imposition is "Multi-up Cut & Stack", a cutting process not actually defined in the workflow description is inferred, the cutting is assumed the inferred form of the imposition of the final product is changed from "Multi-up Cut & Stack" to "None." Since the imposition type is "None," it is inferred that standard bindings such as "Corner Stitch," "Side Stitch," "Tape Binding," etc., are possible binding values. No binding value is specified during the print step, which is consistent with the use of offline finishing. The resulting characteristics from this analysis describe a product type 800, as illustrated in FIG. 11.

The rule-based expert system 235 then compares these characteristics to the already known product type descriptions and determines that "Stitched Pages" (partially) matches the inferred characteristics. Such an approach can be performed based on user direction and the product type description inferred can be saved as a new product type 260 in the product type classification system 220. The new product type description 260 and its association with the given workflow are persistently known to the system 200. Such an approach maps workflow descriptions 245 to product type characteristics to enable the generation of new product type descriptions 260 that can be added to the product type classification system 220. If a workflow is tagged manually (with semantically meaningful product type names and descriptions) then the tagging can be validated utilizing the method 600. The user interface 153 can be utilized to allow the user/operator to interact with the system 200 when validating manual tagging.

Figure 12:
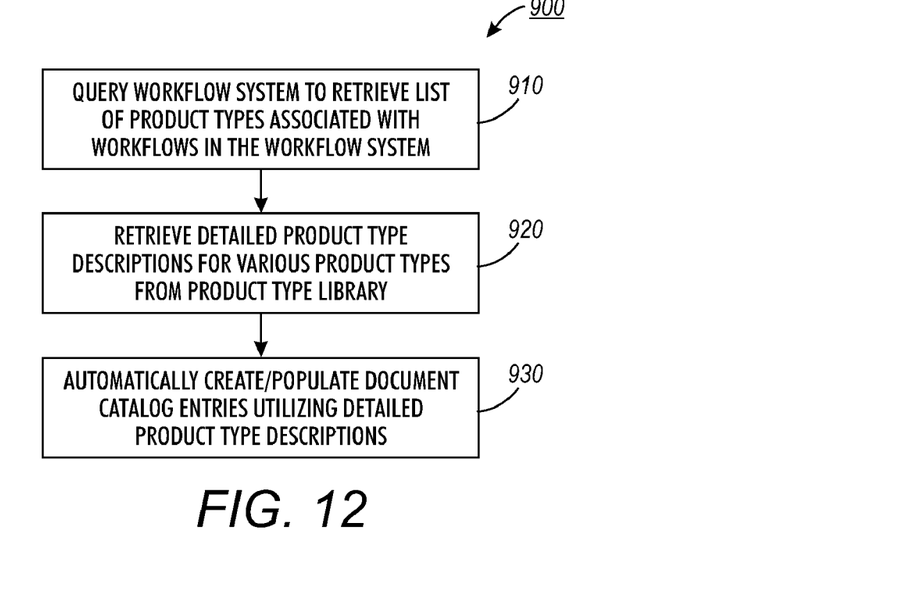
FIG. 12 illustrates a high level flow chart of operations illustrating logical operational steps of a method for automatically populating an order entry system with product catalog entries utilizing product description information, in accordance with another feature of the present invention.

FIG. 12 illustrates a high level flow chart of operations illustrating logical operational steps of a method 900 for automatically populating the order entry system 265 with product catalog entries 270 utilizing product type description information, in accordance with another feature of the present invention. The workflow system 240 can be queried to retrieve a list of product types associated with the workflow system 240 by the order entry system 265, as indicated at block 910. If a list of product types is not available, the order entry system 265 can request the workflow system 240 to determine the list of product types the workflow can manufacture, as described in method 600 and then the list can be subsequently retrieved. Also, the workflow system 240 can be queried to retrieve the list of product types associated with the workflow by the workflow system 240.

Thereafter, the detailed product type descriptions 215 for the various product types can be retrieved from the product type library 210, as illustrated at block 920. The detailed product type descriptions 215 can be utilized to create/populate the document catalog entries 270 that are eventually presented to a print buyer, as indicated at block 930. The order entry system 265 also retrieves the workflow description 245 along with the detailed product type description 215 and uses both when creating/populating the document catalog entries 270. The method 900 reduces the time required to synchronize the configurations of the order entry system 265 with that of the workflow automation system 240 and increases reliability. Also, the method 900 provides a means to enable lights-out automation when utilizing order entry system 265 and workflow automation system 240

Figure 13:
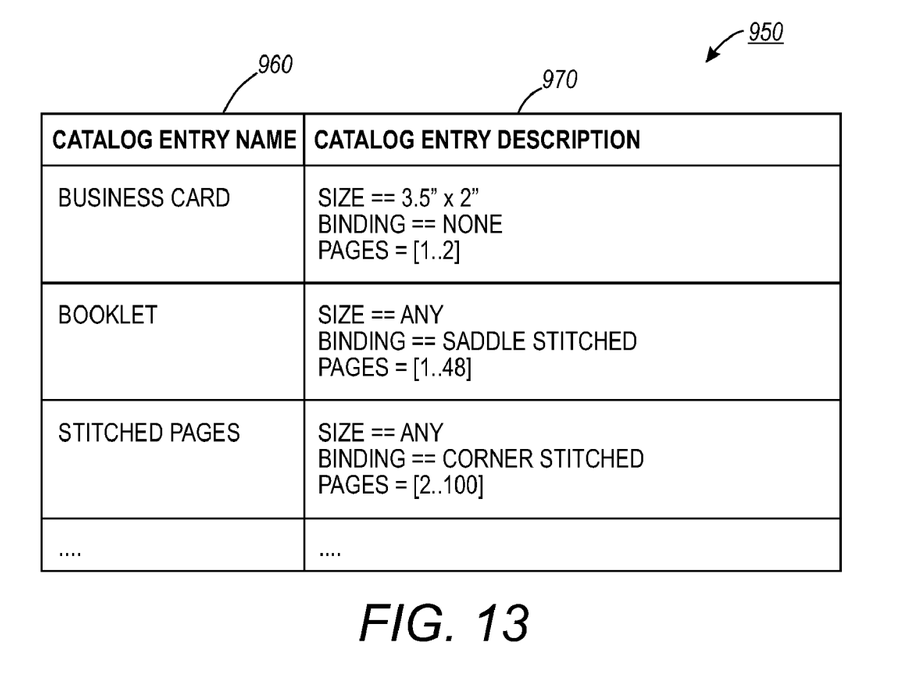
FIG. 13 illustrates a GUI of product catalog entries, in accordance with an exemplary embodiment.

For example, consider the process description resource information associated with the product type library 210 illustrated in FIG. 5, the workflow resource information associated with the workflow automation system 240 illustrated in FIG. 6, and the workflow resource information associated with the product description to manufacture a product type illustrated in FIG. 7. The workflow system 240 returns the list of product type as illustrated in FIG. 7 to the order entry system 265. The order entry system 265 now retrieves the product type description for each product type in the list and creates a product/document catalog entry 960 and 970, as illustrated in FIG. 13. The workflow system 240 automatically populates the catalog entries 270 of the order entry system 265 using semantically well-defined product type descriptions that match precisely the products that can be manufactured by the workflow system 240. The order entry system 265 also retrieve the workflow description along with the detailed product type description and use both when creating/populating document catalog entries 270.

The product description 205 sent to the specific process workflow automation system 250 can be transformed into process networks 255 which is more likely to be consistent with the user's expectations. Also, routing the product description 205 to the workflow that is reliably known to manufacture the product type described by the product description 205 enable some aspects of lights-out automation. Furthermore, reliably associating the workflow with a semantically meaningful product type name or with an entire set of semantically meaningful product type characteristics enables several unique applications. Such an approach allows the customer to define product types simply by defining workflows to manufacture the products. The relationship between the workflow and the description of the type of product to be manufactured by the workflow are known to the user utilizing the workflow system 240.

Note that the methodology disclosed herein (e.g., method 300, 600 and 900) can be implemented in the context of a computer-useable medium that contains a program product. Such a methodology or approach may also be implemented in a computer-usable medium containing a program product. Programs defining particular functions/instructions such as those depicted in the accompanying figures can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Furthermore, it is understood that the present invention may be implemented by a system having components in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDAs), telephones, and any other system capable of processing, transmitting, receiving, capturing and/or storing data.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A non-transitory computer-readable storage medium having computer-executable instructions for performing steps comprising:

transforming a workflow description of a workflow into an inferred product type description utilizing particular facts associated with said workflow and a rule-based expert system;

comparing said inferred product type description to at least one product type description among a plurality of product type descriptions representing known product types;

generating a notification if said rule-based expert system cannot determine said product type description deriving a mapping of said workflow with respect to product types, in response to comparing said inferred product type description to said at least one product type description among said plurality of product type descriptions representing known product types.

2. The method of claim 1 wherein said particular facts comprise at least one of the following: processing steps, sequences of processing steps, types of operations to be performed, and outputs produced.

3. The method of claim 1 further comprising: classifying a product description as a product type; and determining an available workflow from among a plurality of workflows, wherein said available workflow manufactures said product type.

4. The method of claim 3 further comprising: routing said product description directly to said available workflow that manufactures said product type.

5. The method of claim 3 further comprising: converting said inferred product description into a workflow plan.

6. The method of claim 5 further comprising: thereafter routing said workflow plan to said available workflow that manufactures said product type.

7. The method of claim 5 wherein said workflow plan comprises a process network.

8. The method of claim 1 further comprising: adding said product type description to a product type classification scheme, if a match to a pre-existing product type does not exist, wherein said product type description is associated with a newly defined product type name.

9. A system, comprising:

a processor;

a data bus coupled to said processor; and a computer-usable medium embodying computer code, said computer-usable medium being coupled to said data bus, said computer program code comprising instructions executable by said processor and configured for:

transforming a workflow description of a workflow into an inferred product type description utilizing particular facts associated with said workflow and a rule-based expert system;

generating a notification if said rule-based expert system cannot determine said at least one product type description;

comparing said inferred product type description to at least one product type description among a plurality of product type descriptions representing known product types; and deriving a mapping of said workflow with respect to product types, in response to comparing said inferred product type description to said at least one product type description among said plurality of product type descriptions representing known product types.

10. The system of claim 9 wherein said particular facts comprise at least one of the following: processing steps, sequences of processing steps, types of operations to be performed, and outputs produced.

11. The system of claim 9 wherein said instructions are further configured for: classifying a product description as a product type; and determining an available workflow from among a plurality of workflows, wherein said available workflow manufactures said product type.

12. The system of claim 9 wherein said instructions are further configured for routing said product description directly to said available workflow for the manufacture of said product type.

13. The system of claim 11 further comprising wherein said instructions are further configured for: converting said inferred product description into a workflow plan; and thereafter routing said workflow plan to said available workflow that manufactures said product type.

14. The system of claim 13 wherein said workflow plan comprises a process network.

15. The system of claim 9 wherein said instructions are further configured for adding said product type description to a product type classification scheme, if a match to a pre-existing product type does not exist, wherein said product type description is associated with a newly defined product type name.

16. A system, comprising:
   a processor; a data bus coupled to said processor; and
   a computer-usable medium embodying computer code, said computer-usable medium being coupled to said data bus, said computer program code comprising instructions executable by said processor and configured for:
   transforming a workflow description of a workflow into an inferred product type description utilizing particular facts associated with said workflow a rule-based expert system;
   comparing said inferred product type description to at least one product type description among a plurality of product type descriptions representing known product types;
   generating a notification if said rule-based expert system cannot determine said at least one product type description;
   deriving a mapping of said workflow with respect to product types, in response to comparing said inferred product type description to said at least one product type description among said plurality of product type descriptions representing known product types; and.

* * * * *

UNITED STATES PATENT AND TRADEMARK OFFICE
CERTIFICATE OF CORRECTION

PATENT NO. : 8,249,735 B2
APPLICATION NO. : 12/507496
DATED : August 21, 2012
INVENTOR(S) : Kirk J. Ocke, Michael David Shepherd and Dale Ellen Gaucas Page 1 of 1

It is certified that error appears in the above-identified patent and that said Letters Patent is hereby corrected as shown below:

On the Title Page,

Item [75] the spelling for the last name of Dale Ellen Gaucus is incorrect. The correct spelling should be "Gaucas".

Signed and Sealed this
Twenty-third Day of April, 2013

Teresa Stanek Rea
*Acting Director of the United States Patent and Trademark Office*